United States Patent [19]

Chappell

[11] Patent Number: 4,599,079
[45] Date of Patent: Jul. 8, 1986

[54] AUTOMATIC DERAILLEUR SHIFTER

[76] Inventor: Gilmore H. Chappell, 218 S. Melville Street, Philadelphia, Pa. 19139

[21] Appl. No.: 707,960

[22] Filed: Mar. 4, 1985

[51] Int. Cl.$^4$ .............................................. F16H 9/00
[52] U.S. Cl. ........................................ 474/80; 474/82
[58] Field of Search .................... 474/80, 82, 117, 101

[56] References Cited

U.S. PATENT DOCUMENTS

| | | | |
|---|---|---|---|
| 3,613,466 | 10/1971 | Houghton | 474/80 |
| 3,769,848 | 11/1973 | McGuire | 474/80 |
| 3,929,025 | 12/1975 | Perry | 474/70 |
| 4,061,046 | 12/1977 | Lang | 474/80 X |
| 4,343,613 | 8/1982 | Leiter et al. | 474/80 X |
| 4,469,478 | 9/1984 | Weiss | 474/80 |

FOREIGN PATENT DOCUMENTS

222429  7/1942  Switzerland .

Primary Examiner—James A. Leppink
Assistant Examiner—Frank McKenzie
Attorney, Agent, or Firm—Steele, Gould & Fried

[57] ABSTRACT

An automatic shifter for a derailleur is disclosed which includes a pivot arm secured to the frame of the bicycle in stationary relationship, a shifter arm pivotally secured to the pivot arm in a manner to rotatively move relative to the frame, a follower attached to the shifter arm in rotative engagement, an operating spring biasing between the pivot arm and the shifter arm to continuously urge the follower against the upper run of the bicycle chain to depress the chain; a stabilizer interconnected between the pivot arm and the shifter arm in a manner to allow substantially unrestricted counterclockwise rotation of the shifter arm and to deter or restrict clockwise rotative movement of the shifter arm and a flexible cable interconnecting the shifter arm with the derailleur whereby the derailleur will be automatically operated to index the chain across the small diameter cluster gears in response to rotational movement of the shifter arm as caused by interaction of the bicycle chain and the follower.

20 Claims, 13 Drawing Figures

AUTOMATIC DERAILLEUR SHIFTER

BACKGROUND OF THE INVENTION

1. Field of the Invention

The present invention relates generally to the field of bicycle transmissions, and more particularly, relates to an automatic derailleur shifter wherein the gear ratio between the driving and driven gears can be automatically varied in response to the power requirements.

2. Description of the Prior Art

Bicycle transmissions wherein the gear ratio can be automatically varied through a contractible and expandable, large diameter sprocket wheel construction in response to the effort exerted upon the pedals by the cyclist are known. In these types of devices which have been developed for use with the so-called ten speed transmissions, the effective diameter of the driving, large diameter sprocket wheel assembly has been varied by providing a plurality of cooperating sprocket gears and by changing the radial positions of the sprocket gears. The determination of the radial positions of the sprocket gears is an automatic function of the input torque and the parts are so arranged that by increasing the torque, the effective diameter of the sprocket wheel components will be decreased against the bias of an operating spring or springs. Conversely, by decreasing the input torque applied at the pedals, the continuously acting spring or springs function to automatically increase the effective diameter of the sprocket gears. In this manner, the gear ratio between the driving gears and the driven gears can be effectively automatically varied.

In the variable large diameter sprocket wheel types of transmissions, it was the usual practice to disconnect and remove the rear derailleur together with its control cable and lever and to pemanently place the drive chain about one of the rear small cluster gears. Accordingly, all changes in the respective gear ratios of the bicycle transmissions were accomplished by changing the effective diameter of the large driving gear. However, all of these types of prior automatic transmissions suffered from a common problem in that the increase or decrease in the effective diameter of the sprocket wheel assembly could not be smoothly made and the engagement or disengagement of the driving sprockets and the driving chain was always accompanied by an unwanted and uncontrollable clatter or shock, a condition which is definitely detrimental when operating any bicycle transmission, and is especially so under racing conditions. Additionally, most of the prior designs tended to be cumbersome, complicated and somewhat ungainly in appearance.

Other prior workers in the art have attempted to improve the manner of varying the gear ratio by applying special constructions at or about the cluster gears to function the derailleur for gear change purposes. Some of the prior art constructions included electrical changers, pneumatic changers and other mechanical devices which were intended to remotely operate the derailleur. So far as is known, most or all of the prior art gear changing devices required conscious effort on the part of the bicycle rider in order to effect the desired gear change.

The prior art automatic gear ratio changing construction shave tended to be quite complicated and cumbersome in design, thereby resulting in increased manufacturing costs, in increased maintenance costs, in increased weight and in a plurality of interacting components that were continually subject to breakdown or wear. Accordingly, the need remains to provide a simple, lightweight and automatically operating mechanism that is designed to easily change the gear ratio of a bicycle transmission in a smooth manner without conscious effort on the part of the rider.

SUMMARY OF THE INVENTION

The present invention relates generally to the field of automatic bicycle transmissions, and more particularly, is directed to an improved gear ratio changing assembly featuring a derailleur shifting mechanism that is responsive to the input torque upon the drive chain to automatically shift the chain to the proper sized cluster gear for optimum operating efficiency over a varying terrain.

The present invention is adaptable for use with substantially all bicycles of the five speed, ten speed and twelve speed type both as original equipment when installed by the bicycle manufacturer at the time of bicycle assembly and as a retrofit by either the bicycle owner or by a bicycle shop in the case of used bicycles.

The automatic derailleur shifter of the present invention comprises a minimum of interacting parts and includes generally a first, frame connected arm which is fixed in position and which is attachable to the bicycle frame in a simple, sturdy manner in the vicinity of the rear axle. A movable shifter arm is pivotally interconnected to the frame connected arm and is arranged for pivotal movement thereabout. The movable shifter arm rotatively carries a chain roller or follower for imput torque sensing purposes. The follower is installed to press downwardly upon the upper run of the bicycle chain and, when the chain is unstressed, to depress the chain upper run sufficiently to establish an initial position. In the initial position, it is intended that the bicycle chain wil be indexed across the cluster gears by the derailleur to a position wherein the chain will be engaged by the smallest of the cluster gears, thereby providing the maximum gear ratio capability of the system.

A short flexible cable is interconnected between a portion of the movable shifter arm and the cable connector of a conventional derailleur and the cable is adjusted to urge the derailleur to position the bicycle chain upon the smallest of the cluster gears when the chain is unstressed and the movable shifter arm is pivoted to its initial position. A automatic shifter spring is interconnected between a portion of the frame connected arm and a portion of the movable shifter arm to continuously bias the movable shifter arm and the chain follower towards the initial, chain depressing position. A hydraulic or other cylinder or other movement stabilizing means is also interconnected between the fixed arm and the movable shifter arm to control and slow the pivotal movement of the movable shifter arm toward the initial position in the clockwise direction. The stabilizing means has surprisingly been found to permit smooth, automatic functioning of the device with substantially all popular types of existing derailleurs.

When stress is imposed upon the bicycle chain, for example, when bicycling up an incline or hill, the additional torque that must be applied to the pedals will act to additionally tension the chain and tend to straighten the upper run of the chain by reducing the amount of chain depression imposed by the rotatable follower. The straightening of the bicycle chain upper run will force the chain roller or follower upwardly against the bias of the automatic shifter spring, thereby causing the roller attached movable shifter arm to rotate in a counter-clockwise direction relative to the fixed arm. It is noteworthy that the counter-clockwise rotation of the movable shifter arm will be completely unopposed by the hydraulic cylinder or stabilizing means.

The geometry of the system is so designed that the counter-clockwise rotation of the movable shifter arm as caused by increased torque upon the pedals will impose pulling forces on the short flexible cable to thereby cause the pantographic linkage of the derailleur to urge its chain shifting wheel or sprocket transversely inwardly toward the larger of the cluster gears. As the hill or incline becomes steeper, additional torque must be applied at the pedals by the rider to continue upwardly, thereby increasingly tending to linearly straighten the upper run of the bicycle chain. Additional upper run chain straightening will result in increasing the indexing of the derailleur across the cluster gears until the bicycle chain is shifted to the largest of the small cluster gears. In this position, the maximum mechanical advantage of the multi-speed bicycle transmission will have been automatically reached.

When the incline has been successfully traversed and the rider begins to descend, maximum torque will no longer be required upon the pedals and the bicycle chain will no longer be stressed to its maximum. Under these conditions, the automatic shifter spring will tend to overcome the torqueor stresses in the bicycle chain and will begin to depress the upper run of the chain. This depression in turn will cause rotation of the movable shifter arm in a clockwise direction as the follower increasingly tends to depress the upper run of the chain. Depression of the upper run of the chain will cause clockwise rotation of the movable shifter arm relative to the fixed arm and will unstress the short flexible cable by pushing the flexible cable toward the derailleur. The unstressed flexible cable will then allow the existing derailleur spring to function to pantograph linkage in the usual manner to cause the chain shifting sprocket to index the chain transversely across the cluster gears until the chain is properly positioned upon the smallest of the cluster gears. In this position, the maximum speed gear ratio of the transmission design will have been reached.

It will be appreciated that the arrangement of parts of the present invention could produce wild fluctuations in the derailleur operation upon suddenly passing the crest of a hill whereby the bicycle chain would quickly undergo a transition from a highly stressed condition to a relatively unstressed condition. Without more, under such circumstances, the automatic shifter spring would operate to quickly pull the movable shifter arm rotatively in a clockwise direction about the fixed arm, thereby causing an unwanted rapid indexing of the derailleur chain shifting sprocket in a direction from a larger cluster gear towards smaller cluster gear.

In order to prevent such wild, uncontrolled movements, a hydraulic cylinder or other deterrent or stabilizing device has been provided and is connected intermediate the movable shifter arm and the fixed arm to control and smooth out the operation of the automatic shifter spring. The hydraulic flow within the cylinder has been designed to permit substantially unrestricted counter-clockwise rotation of the movable shifter arm while torque is being applied to the bicycle chain and to considerably restrict the movable shifter arm rotation in a clockwise direction when the torque is removed from the bicycle chain. By retarding the clockwise speed of rotation of the movable shifter arm when slack in the chain is sensed by the follower, indexing of the derailleur to move the chain from the larger of the cluster gears toward the smaller of the cluster gears will be slowed to a deliberate, steady, controlled speed. The retarding device also serves to stabilize the operation of the automatic shifter throughout the normal rotative motions of the pedals wherein the inherent operating qualities of a bicycle will result in a cycle rather than in a steady application of torque upon the chain as the bicycle is being propelled.

It is therefore an object of the present invention to provide an improved automatic derailleur shifter for a bicycle transmission of the multi-speed type.

It is another object of the present invention to provide a novel automatic derailleur shifter for a bicycle transmission which comprises a fixed frame connected arm, a shifter arm movable relative to the fixed arm, the movable shifter arm carrying a follower in rotative engagement with the bicycle chain, a spring biasing between the two arms to urge the follower to depress the chain and a cable interconnected between the movable shifter arm and the derailleur to automatically shift the derailleur in response to changes in chain tension as sensed by the follower.

It is another object of the present invention to provide an novel automatic derailleur shifter for a bicycle transmission including roller means to sense tension forces in the bicycle chain, movable arm means carrying the roller means and being pivotally movable in response to changes in chain tension forces as sensed by the roller means, cable means between the movable arm means and the derailleur to move the derailleur when the movable arm means is pivotally moved, spring means to normally bias the roller means against the chain and stabilizing means to retard movement of the movable arm means in a clockwise direction to urge the roller means towards the bicycle chain.

It is another object of the present invention to provide a novel automatic derailleur shifter for a bicycle transmission that is simple in design, rugged in construction and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Figure 1:
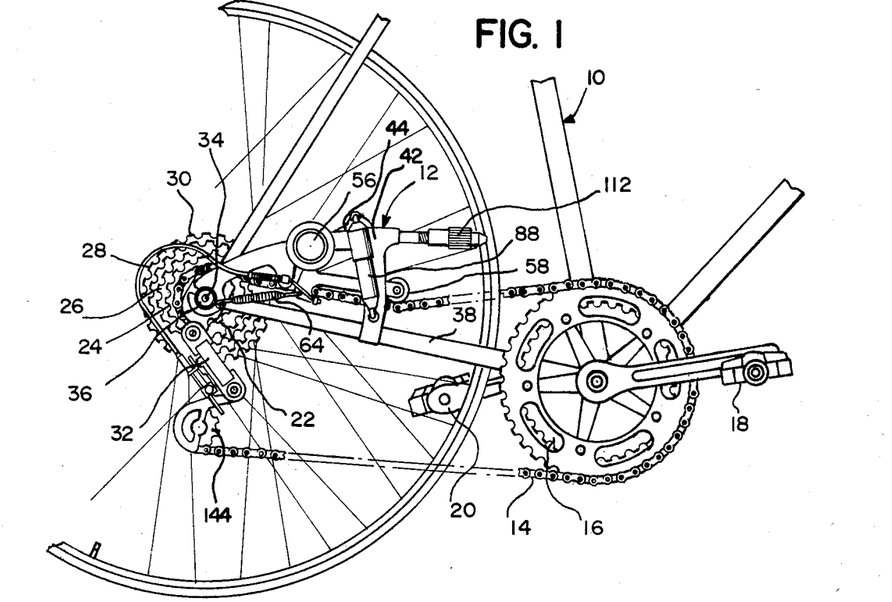
FIG. 1 is a partial side elevational view of an automatic derailleur shifter for a bicycle transmission in accordance with the present invention, showing the upper run of the bicycle chain in a relatively unstressed, depressed condition.
Figure 2:
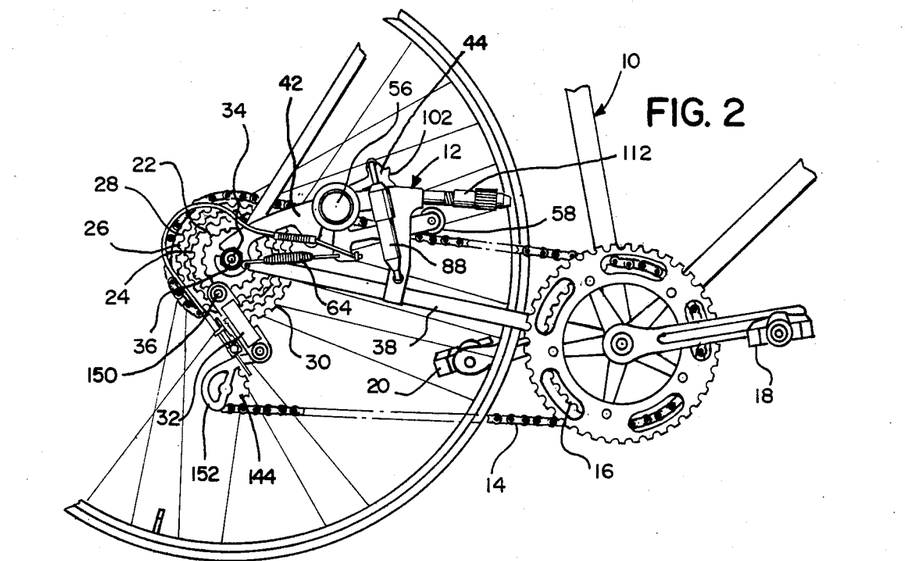
FIG. 2 is a partial, side elevational view similar to FIG. 1, showing particularly the arrangement of parts with the bicycle chain under torque and with the upper run of the chain in substantially linear condition.

Referring now to the drawings, there is illustrated in FIGS. 1 and 2 a portion of a bicycle 10 which comprises generally a frame 38 and a bicycle chain 14 which is rotatively driven by one or more large drive gears 16. A pair of right and left pedals 18, 20 are arranged to supply rotative energy to the large drive gear 16 for chain rotative purposes in the usual manner. In the illustrated embodiment, a pair of large drive gears are utilized in conventional manner to provide for the common ten speed or twelve speed bicycle transmissions. It will be appreciated, however, that only a single large drive gear 16 is necessary to function the automatic derailleur shifter 12 of the present invention, as hereinafter more fully set forth.

In well known manner, a plurality of small cluster gears 22, 24, 26, 28, 30 are rotatively carried on the rear bicycle axle 34 in the usual manner for selective engagement by the bicycle chain 14 as controlled by the indexing function of a usual derailleur 32, which derailleur is conventionally secured adjacent to the rear axle 34 in usual manner.

Figure 3:
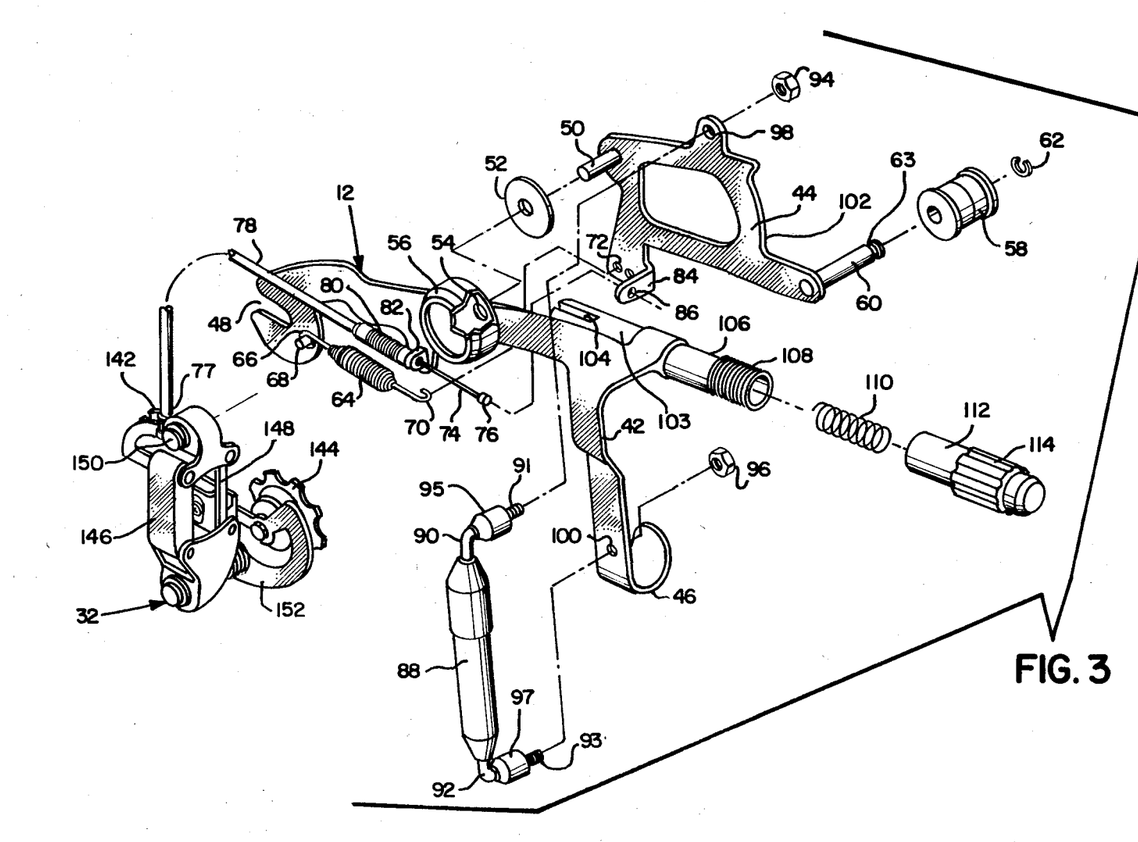
FIG. 3 is an enlarged, exploded, perspective view of the automatic derailleur shifter in juxtaposition to a derailleur.
Figure 4:
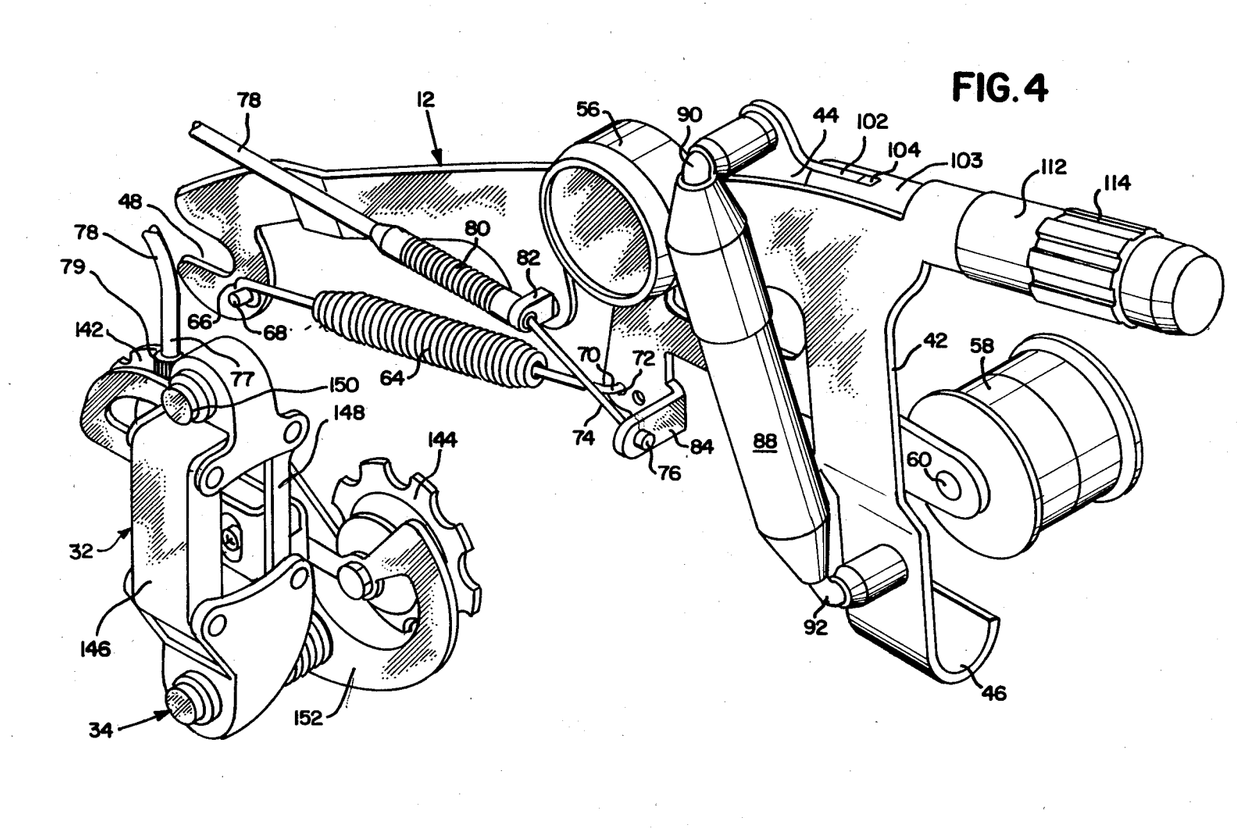
FIG. 4 is an enlarged perspective view of the automatic deraileur shifter of the present invention in juxtaposition to a derailleur.

Still referring to FIGS. 1 and 2 and additionally considering FIGS. 3 and 4, the automatic derailleur shifter 12 of the present invention comprises generally a stationary, frame connected arm 42, which arm is intended to be fixedly secured to the frame 38 of the bicycle 10. As best seen in FIGS. 3 and 4, the fixed arm 42 comprises a bent connecting finger 46 for convenient connection upon a rearwardly positioned strut of the bicycle frame 38. The frame connected arm 42 terminates rearwardly in a rearwardly open axle slot 48 of dimensions suitable to overfit and secure upon the bicycle rear axle 34. The frame connected arm 42 may be easily secured to the bicycle frame 38 simply by first loosening the existing rear axle nut 36 sufficiently to allow the rear axle 34 to be positioned within the rear axle slot 48. With the axle 34 positioned within the rear axle slot 48 and with the bent connecting finger 46 engaged upon a portion of the bicycle frame 38, the nut 36 can be conventionally re-tightened to thus secure the automatic shifter in position.

Still referring to FIGS. 3 and 4, a movable shifter arm 44 is preferably fabricated of strong, planar, relatively lightweight material such as sheet steel or aluminum and is pivotally interconnected with the frame connected arm 42 through an affixed pivot pin 50. The frame connected arm 42 is provided with a pivot opening 54 in position to receive the pivot pin 50 through an intermediate washer 52 to facilitate clockwise and counter-clockwise rotation of the movable shifter arm 44 relative to the frame connected arm 42. If desired, an enclosing cover 56 can be employed over the washer 52 and pivot pin 50 to provide a finished appearance. Optionally, an automatic shifter spring could be so designed to fit within the cover 56 and could be arranged to bias the movable shifter arm 44 in a clockwise rotative direction relative to the fixed frame connected arm 42.

The movable shifter arm 44 forwardly carries a roller shaft 60 upon which a chain roller or follower 58 is rotatively mounted. Preferably, the roller shaft 60 is longer in length than the width of the chain follower 58 whereby the chain follower will be provided with limited axial movement along the roller shaft 60 in response to the chain indexing operation of the derailleur 32 in the manner hereinafter more fully described. Preferably, the chain contacting portion of the follower is fabricated of an extremely tough, wear resistant, elastomeric material of suitable composition to provide long use without chain wear. In a preferred construction, a conventional securing clip 62 can be seated within the roller shaft end groove 63 in well known manner to secure the chain follower 58 upon the roller shaft 60 in a readily replaceable manner. As illustrated in FIGS. 1 and 2, the chain roller or follower 58 is positioned to normally bias downwardly against the upper run of the endless bicycle chain 14 for torque sensing purposes in the manner hereinafter more fully explained.

In spaced relation to the pivot pin 50, the movable shifter arm 44 is provided with a hole or opening 72 to receive therein one end 70 of the automatic shifter spring 64. As best seen in FIGS. 3 and 4, the other end 66 of the coil spring 64 is engaged upon a pin 68 which is carried in fixed manner by the frame connected arm 42 in spaced relationship from the hole 72. Optionally, as above mentioned, a coil spring (not shown) could be positioned about the pivot pin 50 to bias the movable shifter arm relative to the fixed arm 42. The geometry of the system is such that the coil spring 64 continuously biases the movable shifter arm 44 about the pivot pin 50 in a clockwise direction to thereby normally urge the chain follower 58 into engagement with the upper run of the bicycle chain 14. When the chain 14 is relatively unstressed, for example when the bicycle is traveling either along a horizontal plane or on a downhill incline, the spring 64 functions to urge the follower 58 against the upper run of the chain 14 to thereby depress the chain and take up any slack in the system. See FIG. 1.

When the bicycle 10 is being pedalled uphill so that the rider (not illustrated) has to apply more energy at the bicycle pedals 18, 20, the added torque will be applied directly upon the chain 14 for bicycle propelling purposes and any slack in the upper run of the chain will be removed due to the additional applied torque in the system. This will result in a tendency to straighten the upper run of the chain to approach linearity as additional torque is applied at the pedals 18, 20. As the applied torque causes the upper chain run to approach linearity, this will function to raise the chain follower 58 against the bias of the coil spring 64. When the chain follower 58 is thus raised by the applied torque on the chain, it will simultaneously cause a counter-clockwise rotation of the follower affixed movable shifter arm 44 about the frame affixed stationary arm 42.

Referring now to FIGS. 3, 4, 5 and 6, a stabilizing means or cylinder 88 is set forth. In the illustrated embodiment, the stabilizing means 88 is shown as a hydraulic cylinder. However, the invention is not limited to such a construction and other stabilizing means which can be designed to inhibit clockwise rotation of the movable shifter arm 44 relative to the bicycle frame 38 could be employed with equal success, such as gear reducers, air cylinders, etc.

Figure 5:
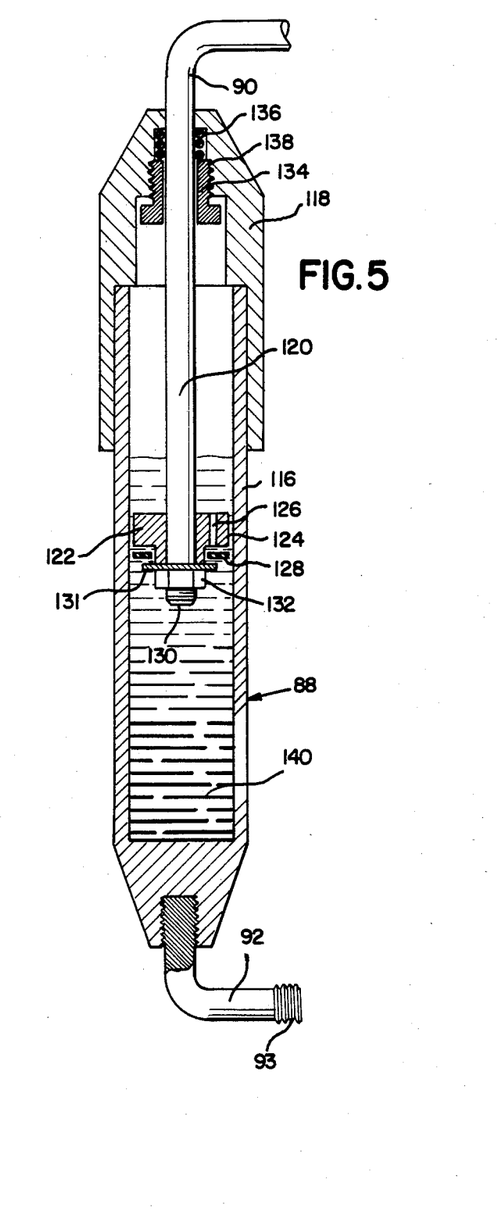
FIG. 5 is an enlarged, cross sectional view of the stabilizing cylinder.
Figure 6:
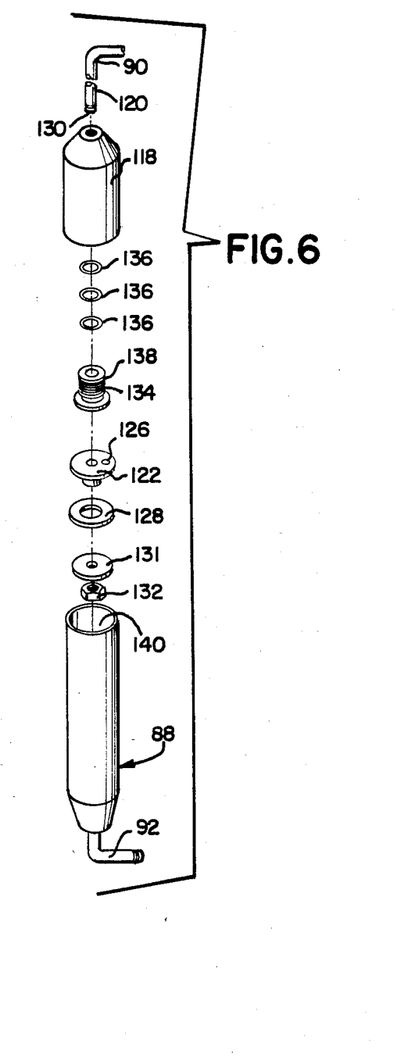
FIG. 6 is an exploded, perspective view of the stabilizing cylinder of FIG. 5.
Figures 7A, 7B:
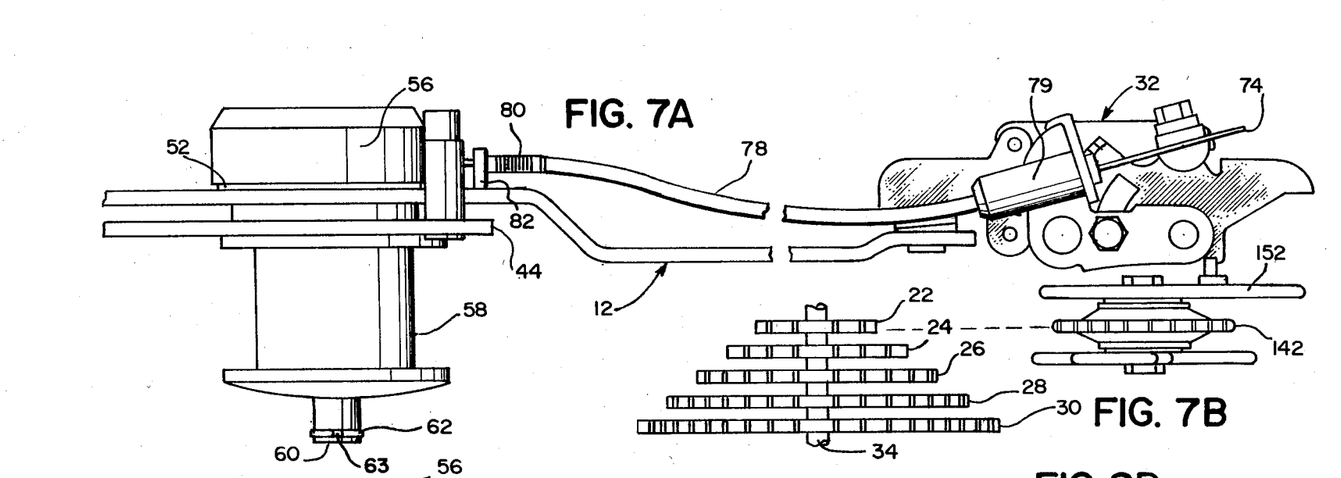
FIGS. 7A and 7B represent an enlarged, partial top plan view of the automatic shifter showing the arrangement of parts when the bicycle chain is in the depressed condition of FIG. 1 and with the cluster gears schematically illustrated for purposes of association.
Figures 8A, 8B:
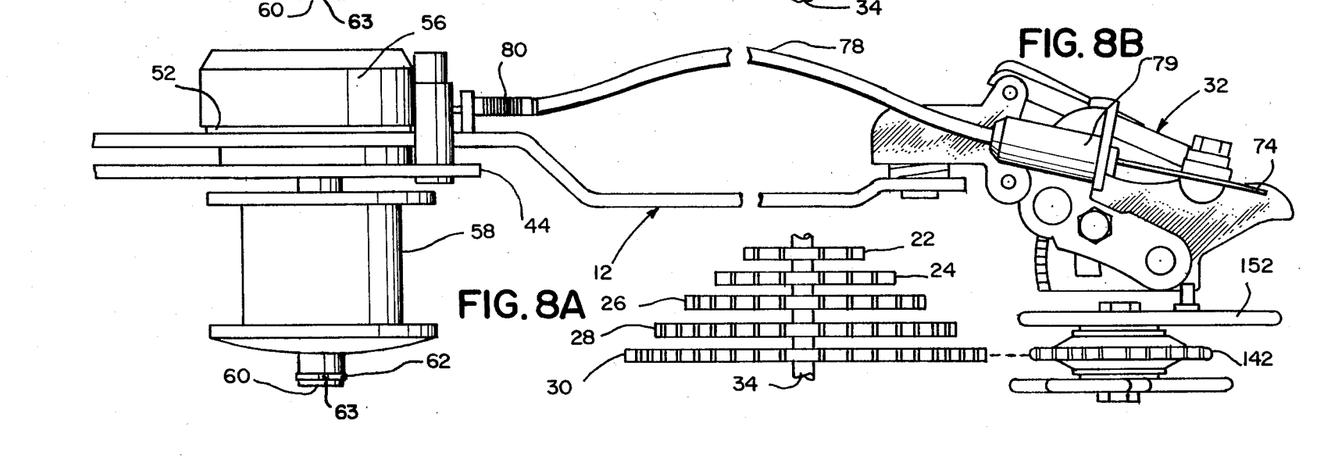
FIGS. 8A and 8B represent an enlarged, partial top plan view of the automatic shifter similar to FIGS. 7 and 7B showing the arrangement of parts when the bicycle chain is in the substantially linear condition of FIG. 2 and with the cluster gears schematically illustrated for purposes of association.

As shown in the illustrated embodiment, the hydraulic cylinder 88 comprises a generally hollow cylindrical body 116 which body terminates downwardly in a fixed, bent lower connector 92 having a conventional threaded end 93. The threaded end 93 is received through an opening 100 provided in the frame connected arm 42 whereby the lower end of the cylinder 88 can be secured to the frame connected arm 42 in sturdy manner by employing a conventional threaded nut 96 and a suitable spacer 97.

The upper end of the hollow body 116 is closed with a cap 118 through which a piston rod 120 is reciprocally movable. A suitable upper fitting or bushing 134 can be engaged at the interior threads 138 to suitably guide the piston rod 120. A plurality of O-rings 136 are employed in the usual manner to prevent leakage of the hydraulic fluid 140 at or about the bushing 134. The piston rod 120 terminates upwardly in a bent upper connector 90 which may include threads 91 in usual manner. The upper connector 90 is affixed to the movable shifter arm 44 at the connector opening 98 by employing a conventional nut 94 and suitable spacer 95. Thus it is seen that the cylinder 88 is interconnected between the movable shifter arm 44 and the fixed frame connected arm 42 to act as a deterrent to clockwise rotation of the movable shifter arm in the stabilizing manner hereinafter more fully set forth.

Still referring to FIGS. 5 and 6, the piston rod 120 terminates downwardly in a threaded end 130 to threadedly receive thereon a nut 132 and a securing washer 131. A piston 122 is secured upon the lower end of the piston rod 120 and is fabricated of suitable diameter to be a relatively loose fit within the interior of the hollow body 116 to thereby permit a limited quantity of hydraulic fluid 140 to peripherally flow in the clearance space 124 provided between the outer periphery of the piston 122 and the inner peripheral surface of the hollow cylinder body 116 when the piston is moved relative to the body. A hydraulic port 126 is drilled or otherwise provided through the piston 122 to facilitate the flow of hydraulic fluid 140 therethrough during upward piston movement. A sealing washer 128 is interposed between the securing washer 131 and the bottom of the piston 122 in a relatively loose manner whereby the washer 128 permits free flow of hydraulic fluid through the port 126 when the piston 122 and piston arm 120 are being moved upwardly relative to the cylinder body 116. (See FIG. 10a). When the piston arm 120 and the affixed piston 122 are being downwardly urged within the hollow body 116, the sealing washer 128 will be urged upwardly against the lower terminus of the hydraulic port 126 to thereby seal the port and prevent the flow of hydraulic fluid therethrough. (See FIG. 10b).

Referring now to FIGS. 1, 2, 3 and 4, a conventional derailleur 32 is affixed to the bicycle frame 38 adjacent to the rear axle 34 in well known manner, for example by employing a threaded fastener 150 in conventional manner. The derailleur 32 is constructed in accordance with well known derailleur construction principles and includes generally a pivoting parallelogram linkage 146, 148 to which is conventionally, relatively pivotally arranged, a chain guide 152. The chain guide 152 rotatively supports the upper and lower chain contacting sprockets 142, 144 for chain shifting and chain takeup purposes in manner well known to those skilled in the art. The derailleur 32 is entirely conventional in construction and forms no part of the present invention. Rather, the automatic shifter 12 of the present invention is intended to operate with substantially all popular, existing derailleurs 32 and to provide an automatically operating substitution for the previous control cable and hand operating lever (both not shown) which were formerly utilized to manually function the derailleur to shift the chain across the plurality of cluster gears or driven sprockets 22, 24, 26, 28, 30.

As illustrated, a control cable 74 within a usual cable sheath 78 is interconnected between the movable shifter arm 44 and the derailleur 32 to cause indexing, transverse movement of the derailleur in an automatic manner upon rotative movement of the movable shifter arm 44 relative to the fixed arm 42.

Upon removal of the existing derailleur control cable (not illustrated), one end 77 of the flexible control cable 74 can be secured to the derailleur 32 at the existing cable terminal construction by employing the existing terminal connector 79. Thus, upon axial movement of the flexible cable 74, as controlled by pivotal movement of the shifter arm 44, the existing derailleur 32 will be caused to function in its conventional expected manner. The other end of the cable sheath 78 can be conventionally secured to the sheath connector block 82 which is affixed to the frame connected arm 42 in usual manner. Preferably, a sheath spring 80 is interposed between the end of the sheath 78 and the connector block 82 to accommodate length variations between the sheath 78 and the control cable 74 as the derailleur 32 is transversely urged across the plurality of cluster gears.

The end of the control cable 74 adjacent to the automatic shifter 12 can be provided with a conventional cable terminal 76, which terminal is suitably engaged within the opening 86 provided in the cable connector 84 which is provided in a portion of the movable shifter arm 44 in spaced relationship from the pivot pin 50. See FIGS. 3 and 4. It will thus be seen that when the movable shifter arm 44 is caused to rotate relative to the fixed frame connected arm 42 about the pivot pin 50 in response to changes in chain tension as sensed by the chain roller or follower 58, the rotative movement of the movable shifter arm 44 thus caused will result in axial movement of the affixed control cable 74 to thereby render the transverse derailleur movement directly responsive to rotative movement of the movable shifter arm 44.

As best seen in FIG. 3, in a preferred construction, the movable shifter arm 44 is positioned with a forward adjusting edge or cam surface 102 which is provided immediately rearwardly of the follower 58. A strength adjusting piston 103 having an adjusting notch 104 formed in the rearward end thereof is reciprocal within the stationary barrel 106 which is fixedly carried by the frame connected arm 42. A control spring 110 is provided to normally bias the adjusting piston 103 rearwardly, or to the left as shown in FIG. 3. As illustrated, the hollow barrel 106 terminates forwardly in a threaded end 108 to receive thereon the adjusting knob 112, which knob preferably includes a knurled portion 114 to facilitate threaded adjustment.

By threadedly turning the adjusting knob 112 relative to the barrel 106, the coil spring 110 can be compressed to impose increased spring bias against the adjusting piston 103 and thereby increasingly urge the piston 103 into frictional engagement with the cam surface 102 of the movable shifter arm 44. Preferably, the adjusting notch 104 is employed to assure positive engagement of the operating parts. By either increasing or decreasing the bias of the spring 110, the frictional engagement of the adjusting piston 103 against the cam surface 102 can be varied to thereby increase or decrease the ease of rotation of the movable shifter arm 44 relative to the fixed frame connected arm 42 about the pivot pin 50. In this manner, the automatic shifter 12 can be fine-tuned as necessary to compensate for the individual characteristics and preferences of the rider, such as strength, weight, individual feel, etc.

Referring now to FIGS. 7A, 7B, 8A, 8B, 9, 10a and 10b, the operation of the automatic derailleur shifter will now be described. When the bicycle chain 14 is relatively unstressed, the operating spring 64 will normally cause clockwise rotation of the movable shifter arm 44 about the pivot 50 to urge the chain follower 58 against the chain 14, thereby depressing the upper run of the chain in the manner illustrated in FIGS. 1 and 9. Such clockwise rotation of the movable shifter arm 44 causes simultaneous axial movement of the control cable 74 in a direction toward the derailleur 32 to thereby allow the derailleur to shift toward the right to move the bicycle transmission to its maximum speed position by tending to align the derailleur upper sprocket 142 with the smallest cluster gear 22. This alignment provides the maximum gear ratio and highest speed for substantially level or downwardly inclined road conditions. See FIGS. 7A and 7B.

Figures 9, 10A, 10B:
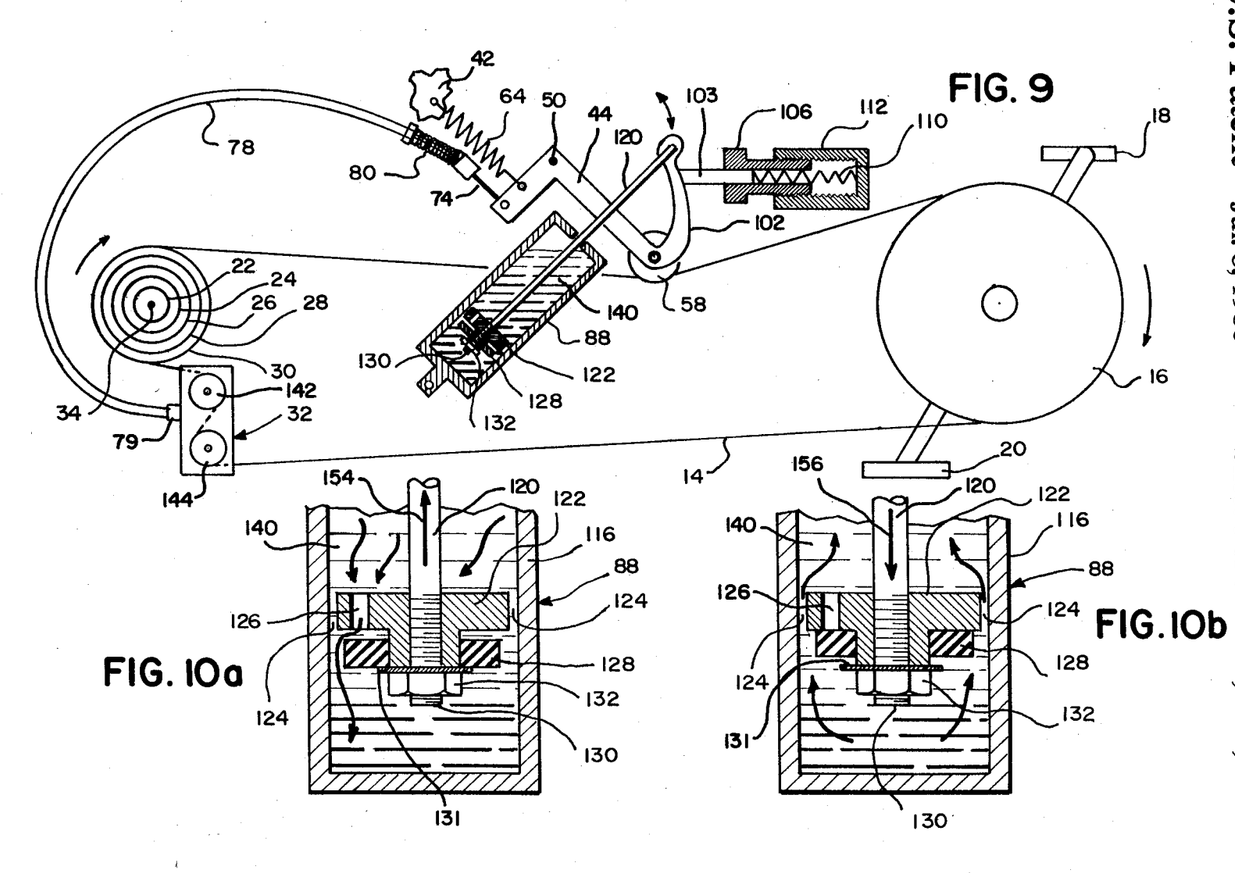
FIG. 9 is a diagrammatic representation of the operating parts of the automatic derailleur shifter.
FIG. 10a is an enlarged, partial, schematic illustration of the operation of the stabilizing hydraulic cylinder when the movable shifter arm is being urged in a counter-clockwise direction.
FIG. 10b is an enlarged, partial, schematic illustration of the operation of the stabilizing hydraulic cylinder when the movable shifter arm is being biased in a clockwise rotative direction.

Upon reaching upwardly inclined terrain wherein the cyclist will be required to apply additional forces upon the pedals 18, 20, the chain 14 will be additionally stressed, thereby causing the upper run of the chain to approach linearity in the manner illustrated in FIG. 2. Under such stressed conditions, the chain follower 58 will be urged to rotate the movable shifter arm 44 about the pivot 50 in a counter-clockwise direction. As best seen in FIG. 9, counter-clockwise rotation of the movable shifter arm 44 will axially pull the control cable 74 and thereby function the derailleur 32 to cause the chain 14 to index transversely across the cluster gears 22, 24, 26, 28, 30. Increased derailleur deflection will cause the derailleur upper sprocket 142 to tend to align with the largest gear 30 of the plurality of cluster gears in the manner illustrated in FIGS. 8A and 8B to thus provide the maximum mechanical advantage provided by the bicycle gearing system.

Without more, should the torque applied upon the bicycle chain 14 be removed, for example when reaching the crest of a hill, the operating spring 64 would immediately function to pull the movable shifter arm 44 in a clockwise direction about its pivot 50. This movement would cause a considerable shock and clattering in the transmission because such a sudden application of the spring forces would result in rapid transverse movement of the derailleur upper sprocket 142 from alignment with the largest cluster gear 30 into alignment with the smallest cluster gear 22 in an uncontrolled manner.

In order to prevent such wild and uncontrolled movements of the derailleur, the stabilizing or deterrent means 88 has been provided to restrain the speed of rotation of the movable shifter arm 44 in a clockwise direction about the pivot 50.

Referring particularly to FIG. 10a, it will be seen that when the stresses applied to the endless chain 14 are sufficient to cause the chain follower 58 to rotate the movable shifter arm 44 in a counter-clockwise direction about the pivot 50, the piston arm 120 will simultaneously be pulled upwardly relative to the cylinder body 116 to thereby urge the piston 122 upwardly within the cylinder in the direction indicated by the arrow 154. Upward movement of the piston 122 causes the sealing washer 128 to be urged away from the hydraulic port 126 and into engagement with the lower washer 131. With the upward movement of the piston 122, the hydraulic fluid 140 freely travels through the hydraulic port 126 and through the peripheral clearance space 124 which is provided between the outer periphery of the piston 122 and the interior periphery of the cylinder body 116 to thereby provide only a minimal restraint to the counter-clockwise rotation of the movable shifter arm 44.

Upon removal of the stresses in the endless chain 14, for example when reaching the crest of the hill, the chain follower 58 will be spring urged by the bias of the spring 64 to attempt to depress the upper run of the chain and thereby cause clockwise rotation of the movable shifter arm 44. Clockwise rotation of the movable shifter arm 44 about the pivot 50 will cause simultaneous downward movement of the piston rod 120 as illustrated by the arrow 156. See FIG. 10b. Downward movement of the piston rod 120 and the affixed piston 122 will cause the sealing washer 128 to engage over and seal against the lower terminus of the hydraulic port 126, thereby effectively closing the port to the passage of hydraulic fluid 140.

With the hydraulic port 126 thus covered by the sealing washer 128, the hydraulic fluid can only pass about the peripheral clearance space 124 provided between the outer periphery of the piston 122 and the inner peripheral surface of the cylinder body 116. This restricted hydraulic passage severely restricts the vertical upward movement of the piston 122 relative to the cylinder body 116, thereby stabilizing or retarding the speed of clockwise rotation of the movable shifter arm 44 about the pivot 50. This restricting effect causes the derailleur to move deliberately and slowly across the plurality of cluster gears from the position illustrated in FIG. 8B to the position illustrated in FIG. 7B and thus provides an extremely smooth and completely acceptably automatic derailleur shifting arrangement.

Additionally, as above mentioned, it will be appreciated that power is not applied evenly to the pedals 18, 20 as they are rotatively driven by the rider. Rather, the application of power is applied cyclicly as each pedal is rotatively driven from a position past the top of its arc of rotation to a position near the bottom of its arc of rotation. Due to the cyclical nature of the application of torque upon the chain 14 by rotation of the pedals 18, 20, there is a tendency to develop rapid fluctuations in the torque applied upon the chain, which fluctuations in chain tension could cause rapid arcuate reciprocations of the movable shifter 44 about its pivot 50 as the fluctuations were sensed by the chain follower 58. Such a condition would be unacceptable to an ordinarily sensitive rider. The restricted movement of the hydraulic fluid 140 within the peripheral clearance space 124 additionally serves to prevent such unwanted movable arm reciprocation even though there may be rapid fluctuations in the chain tension.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. An automatic shifter for a derailleur attached to the frame of a bicycle of the type having large drive gear, an endless drive chain, a rear axle and a cluster of driven gears comprising
    pivot means secured to the frame in spaced relation shift to the derailleur;
    shifter arm means pivotally secured to the pivot means to move relative to the frame;
    a follower means attached to the shifter arm means, the follower means being in contact with the endless chain to rotatively move the shifter arm means in response to changes in tension in the chain;
    spring means interconnected between the pivot means and the shifter arm means to continuously bias the follower means into contact with the chain;
    stabilizing means interconnected between the pivot means and the shifter arm means to retard the bias of the spring means; and
    cable means interconnecting a portion of the shifter arm means and the derailleur to move the derailleur to index the chain across the cluster of driven gears in response to movement of the shifter arm means.

2. The automatic shifter of claim 1 wherein the pivot means comprises a frame connected arm fixedly secured to the frame, the frame connected arm being provided with a rearwardly open slot, the slot being adapted to receive the rear axle therein.

3. The automatic shifter of claim 2 wherein the frame connected arm further comprises an adjusting piston, the piston being in contact with the shifter arm means.

4. The automatic shifter of claim 3 wherein the shifter arm means comprises a cam surface, the piston being in frictional engagement with the cam surface.

5. The automatic shifter of claim 4 and adjustment means to vary the force of the frictional engagement.

6. The automatic shifter of claim 1 wherein the follower means comprises a chain contacting roller.

7. The automatic shifter of claim 6 wherein the roller comprises a body that is fabricated of wear resistant, elastomeric material.

8. The automatic shifter of claim 6 wherein the follower means further comprises a roller shaft affixed to the shifter arm means, the roller shaft being longer than the width of the roller whereby the roller will have limited axial movement along the roller shaft.

9. The automatic shifter of claim 1 wherein the spring means comprises a coil spring.

10. The automatic shifter of claim 1 wherein the stabilizing means comprises a cylinder.

11. The automatic shifter of claim 10 wherein the cylinder comprises a body, movable piston within the body, hydraulic fluid in the body and means to restrict movement of the piston through the hydraulic fluid in one direction.

12. The automatic shifter of claim 11 wherein the means to restrict comprises a hydraulic port in the piston and a sealing washer that is movable to seal the hydraulic port.

13. The method of automatically shifting the derailleur of a bicycle transmission to move the drive chain of a multi-gear bicycle transversely into selective engagement with one of a plurality of small cluster gears comprising the steps of
    securely affixing a pivot means to the bicycle in spaced relation from the derailleur;
    pivotally securing a movable shifter arm to the pivotal means;
    affixing a chain follower upon the movable arm and applying the chain follower against the bicycle chain;
    rotating the bicycle chain and urging the chain follower against the chain to tend to depress a portion of the chain;
    pivotally moving the movable shifter arm as the chain is being depressed;
    retarding the pivotal movement of the movable shifter arm relative to the pivot means in a direction tending to depress the chain; and
    interconnecting a flexible cable intermediate movable shifter arm and the derailleur and causing the derailleur to index the chain across the cluster gears in response to changes in chain tension as sensed by the chain follower.

14. The method of claim 13 wherein the urging comprises spring biasing the chain follower against the chain.

15. The method of claim 14 wherein the urging further comprises interconnecting a spring between the pivot means and the movable shifter arm means.

16. The method of claim 13 wherein the rotating comprises rotating the chain follower.

17. The method of claim 13 wherein the retarding comprises interconnecting a deterrent means intermediate the pivot means and the movable shifter arm means.

18. The method of claim 17 wherein the deterrent means comprises a hydraulic cylinder and the retarding further comprises restricting the flow of hydraulic fluid in one direction.

19. The method of claim 13 and the further step of frictionally engaging the movable shifter arm with a portion of the pivot means.

20. The method of claim 19 and the step of varying the frictional engagement of the movable shifter arm and the said portion of the pivot means.

* * * * *